J. M. BURTON.
WATER METER.
APPLICATION FILED JULY 18, 1913.
1,093,571.
Patented Apr. 14, 1914.
3 SHEETS—SHEET 3.
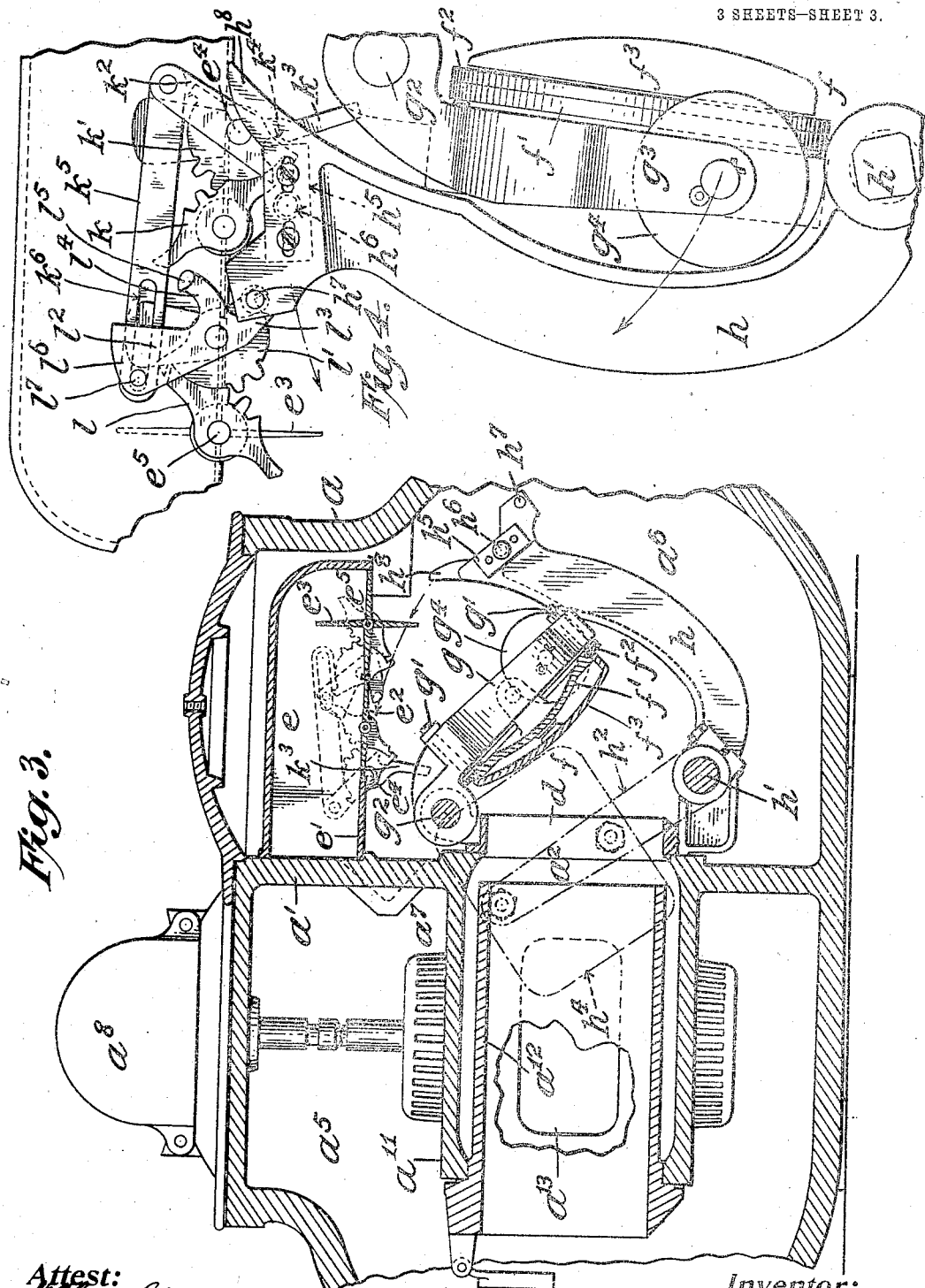

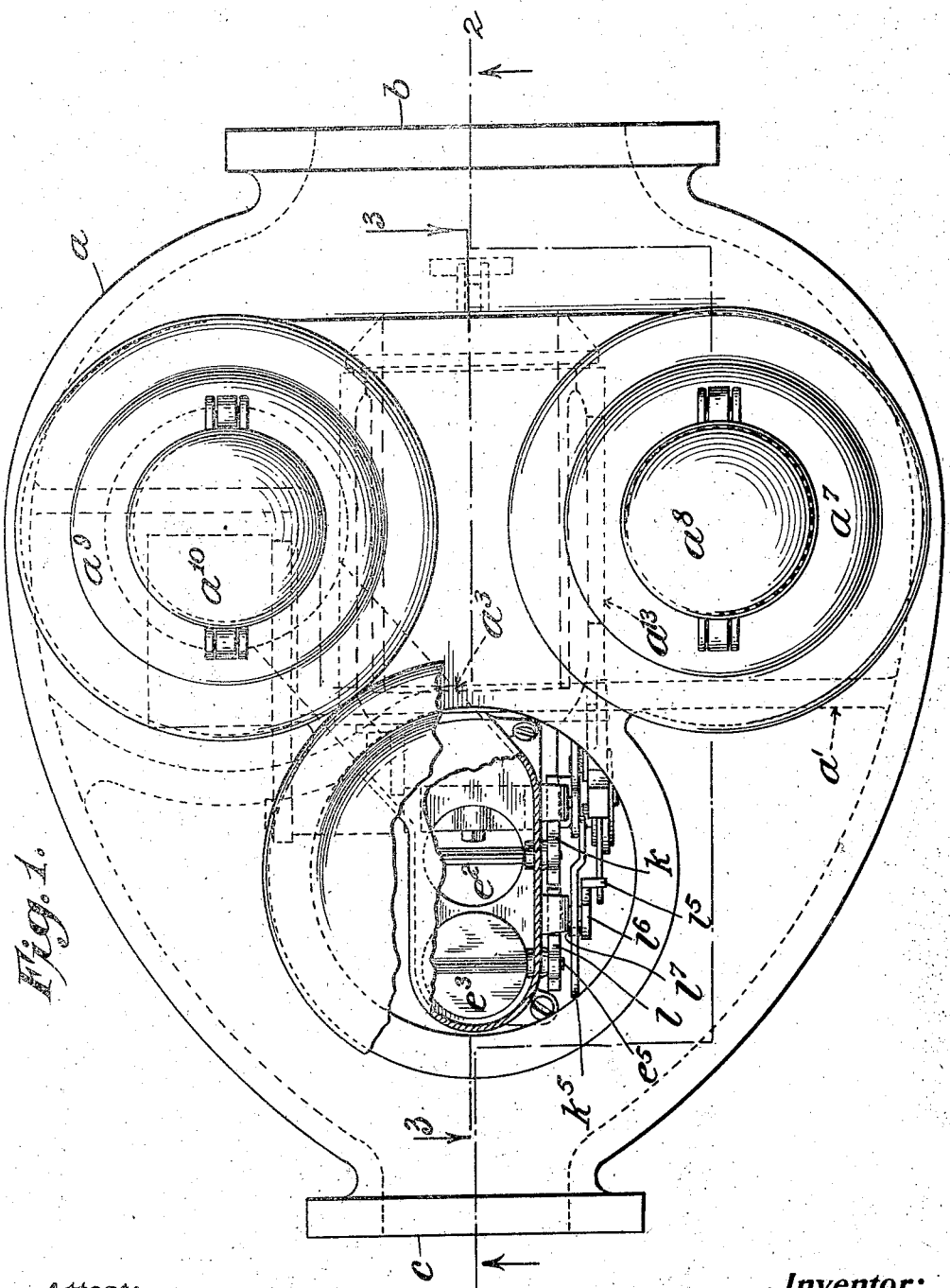

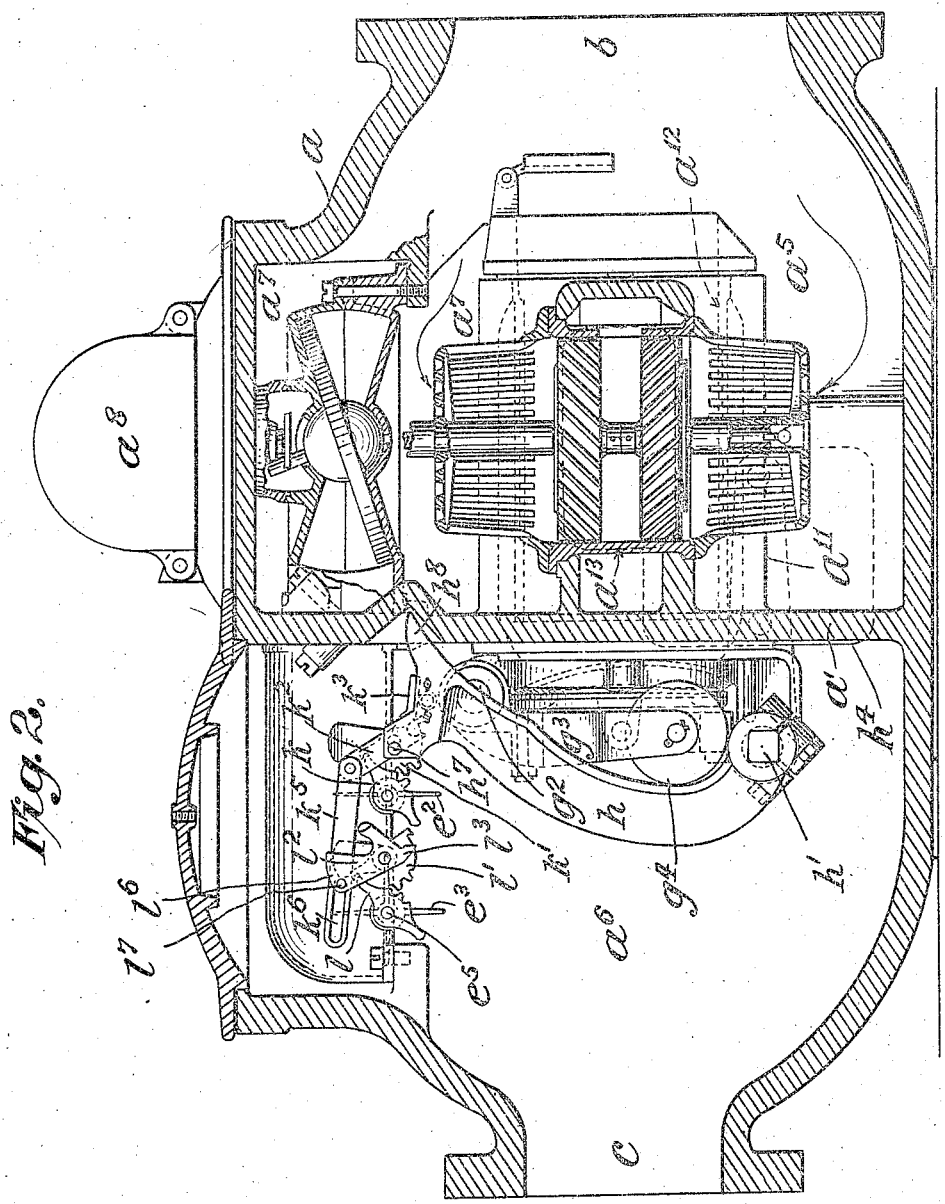

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

WATER-METER.

1,093,571. Specification of Letters Patent. Patented Apr. 14, 1914.

Application filed July 18, 1913. Serial No. 779,661.

*To all whom it may concern:*

Be it known that I, JAMES M. BURTON, a citizen of the United States, residing in Long Island City, county of Queens, in the State of New York, have invented certain new and useful Improvements in Water-Meters, of which the following is a specification, reference being had to the accompanying drawings, which form a part hereof.

In Letters Patent of the United States No. 1,001,578, dated August 22, 1911, there is shown and described a water meter in which the ordinary or low-duty flow is metered and in which an extraordinary or high-duty flow is permitted without obstruction or substantial reduction of head, such high-duty flow taking place when water is required in unusually large quantities for fire purposes. In an application for Letters Patent filed by the present applicant December 15, 1911, Serial No. 665,924, there is shown and described a meter of the same general character as that shown and described in said Letters Patent, but in which there is provided not only a metering device for low-duty flow but a proportional metering device for high-duty flow at one side of the path of straight-flow, the high-duty passage and the low-duty passage being controlled by valves, the one of which closes as the other opens, and vice versa.

The present invention relates to meters of the character of that shown in said Letters Patent and in said application and especially to meters of the particular character shown in said application, in which both passages are controlled by valves.

The objects of this invention are to secure a very quick closing of the low-duty valve when the high-duty valve opens and in fact a closing of the low-duty valve as the high-duty valve starts to open and before it does actually open, so that the accumulated pressure behind the high-duty valve throws it open very quickly; and to provide for a temporary relief of pressure through the low-duty passage as the high-duty valve is closing, so that there shall be a partial equalization of pressure whereby the high-duty valve is permitted to make its final closing movement very quickly. The general purpose, of course, is to prevent loss of accuracy in metering at the time of changing from one flow to the other.

The invention will be more fully explained hereinafter with reference to the accompanying drawings in which it is illustrated and in which—

Figure 1 is a top view, partly in horizontal section, of a meter which embodies the invention. Fig. 2 is a view in vertical section on the irregular plane indicated by the broken line 2—2 of Fig. 1, looking in the direction of the arrows, some parts being shown in elevation. Fig. 3 is a partial view in vertical section on the plane indicated by the broken line 3—3 of Fig. 1, looking in the direction of the arrows. Fig. 4 is a detail view of some of the parts shown at the right hand of Fig. 2, in a different position, the scale being somewhat larger than that of Fig. 2.

The casing $a$, having an inlet $b$ and an outlet $c$, is shown as having a generally transverse wall $a'$ which is provided with high-duty orifice $a^2$ in a straight line with the inlet and the outlet and of substantially the same area as the outlet, and with a low-duty orifice indicated by dotted lines at $a^3$. The wall $a'$ may also have an orifice, indicated by dotted lines at $a^{13}$, for the passage of water from the inferential meter hereinafter referred to. The wall $a'$ substantially divides the interior of the casing into an inlet chamber $a^5$ and an outlet chamber $a^6$. The metering devices hereinafter referred to are located in the inlet chamber and the high-duty and low-duty valves and their supporting and controlling devices are located in the outlet chamber $a^6$. The metering devices may be of any suitable character, the high-duty metering device $a^7$ being an inferential metering device, with its turbine wheels or ordinary construction, arranged wholly at one side of the path of high-duty flow, and connected in the usual manner to an ordinary register, the location of which is indicated at $a^8$. The low-duty metering device $a^9$ is preferably positive, and is shown conventionally as located at one side of and above the path of the high-duty flow and as connected in the usual manner to a low-duty register of ordinary construction, the location of which is indicated at $a^{10}$. As will be understood, during a period of high-duty flow a small proportion of the total flow passes through the high-duty metering device $a^7$ and serves to register inferentially or by proportion the total flow, while during a period of low-duty service the entire flow is through the low-duty metering device $a^9$, there being no flow through the high-duty metering device or the orifice $a^2$.

The partition wall $a'$ is preferably provided with a sleeve $a^{11}$ which is extended toward the inlet, and this sleeve is shown in the drawings as provided with a removable lining $a^{12}$. The space between the outer sleeve $a^{11}$ and the removable lining $a^{12}$ furnishes a channel through which that portion of the high-duty flow which passes through the high-duty metering device $a^i$ which escapes through a port $a^{13}$ shown in dotted lines in Fig. 3, from the casing of the high-duty metering device, finds an outlet to the high-duty orifice $a^2$. On the outlet side of the wall $a'$, surrounding the orifice $a^2$, is secured a sleeve or ring $d$ which supports and forms a seat for the high-duty valve $f$. The latter preferably comprises a main part $f'$ which is pivoted upon an arm $g$ and carries a gasket $f^2$ for coöperation with the edge of the sleeve or ring $d$, and an unsymmetrical part $f^3$ which enters within the sleeve or ring $d$, projecting farther within the sleeve at the side remote from the pivot of the arm $g$ than it does at the side nearer the pivot so that, in the outward swinging movement of the valve with the arm clearance of the valve from the sleeve shall be simultaneous at all points of the circumference. Adjusting screws $g'$ are carried by the arm $g$ for the purpose of adjusting accurately the relative position of the valve on the arm $g$. The arm $g$ is secured to a shaft $g^2$ which may be mounted in bearings carried by the ring $d$. An arm $g^3$, also secured to the shaft $g^2$, carries a roller $g^4$ which bears against a cam arm $h$. The latter is secured to a shaft $h'$, mounted in suitable bearings which may be carried by the ring $d$, the shaft $h'$ having secured at one end an arm $h^2$, shown in broken lines in Fig. 3, which carries a weight $h^4$. The weight $h^4$, under conditions of low-duty service, holds the valve $f$ tightly to its seat, but when the pressure differential increases greatly, as at the time of high-duty flow, the valve $f$ swings open against the action of the weight $h^4$, the roller $g^4$ of the arm $g^3$ acting against the cam arm $h$, and quickly reaches its wide open position in which, through the approach of the weighted arm $h^2$ to a vertical position, the valve is held by the flow of water through the port $a^2$ without material loss of head.

On the outlet side of the wall $a'$, in registration with the orifice $a^3$ through which the water is discharged from the low-duty metering device $a^9$, is secured a shell $e$ of suitable form and preferably having a flat floor $e'$, in which are pivotally mounted a single butterfly valve $e^2$ and a double or cross-bladed butterfly valve $e^3$. The shaft of the valve $e^2$ has fixed at one end thereof a mutilated or Geneva gear $k$ with which coöperates, in the usual manner, a Geneva gear $k'$, for the purpose of controlling the movement of the valve $e^2$. An arm $k^2$, secured upon the shaft $e^4$ or upon the Geneva gear $k'$, is provided at one end with a finger $k^3$ and a notch $k^4$, and at the other end has pivoted thereto a link $k^5$ which is slotted as at $k^6$. On the shaft $e^5$ of the double butterfly valve $e^3$ is secured a Geneva gear $l$ which coöperates in the usual manner with a mutilated or Geneva gear $l'$ which is suitably pivoted adjacent to the shaft $e^5$. Mounted upon the same pivot so as to move with the Geneva gear $l'$, is a three-armed plate $l^2$, having an arm $l^3$, an arm $l^4$ with a projecting beveled lug $l^5$, and an arm $l^6$ provided with a pin $l^7$ which enters the slot $k^6$ in the link $k^5$. The cam arm $h$ carries, on an adjustable plate $h^5$, a pin $h^6$. The arm $h$ is also provided with a pin $h^7$ and the end of the arm is extended to form a toe $h^8$.

The operation of the high-duty valve $f$ has already been described.

In describing the operation of the low-duty valves it will be assumed first that the parts are in the position shown in Fig. 2, with the high-duty valve $f$ closed, the low-duty butterfly valve $e^2$ in open position and the low-duty butterfly valve $e^3$ in closed position, the entire flow under the low-duty conditions then passing through the low-duty metering device $a^9$ and through the opening controlled by the valve $e^2$. If it be assumed now that the pressure differential increases greatly so that the valve $f$ begins to open, the pin $h^6$ of the lever $h$ engages the notch $k^4$ of the arm $k^2$ and effects nearly a quarter turn of the butterfly valve $e^2$ thus substantially shutting off the flow through the low-duty metering device, before the valve $f$ has actually opened, thereby increasing momentarily the differential of pressure which tends to open the valve $f$, so that the continued movement of the valve $f$ is very quick. In the continued opening movement of the valve $f$ the pin $h^7$ of the lever $h$ strikes the arm $l^3$ and throws it from the position shown in Figs. 2 and 4 to the position shown in Fig. 3. It will be understood that while in Fig. 2 the parts are shown in the positions which they occupy when the valve $f$ is closed and the valve $e^2$ is open, they are shown in Fig. 4 in the positions which they occupy when the valve $e^2$ has been closed and the valve has commenced to open, the arm $l^2$ still being in the position which it occupies when the valve $e^2$ is open, as shown in Fig. 2. It will further be noted that during the movement of the valve $e^2$ already described, the slotted link $k^5$ slides on the pin $l^7$, by reason of the provision of the slot $k^6$, so that the arm $l^2$ is not moved by the movement of the arm $k^2$ and the valve $e^2$. In this position, however, the pin $l^7$ stands in the left hand end of the slot $k^6$, as shown in Fig. 4, so that when the arm $l^2$ is moved by the pin $l^7$ of the arm $h$, the pin $l^7$ travels freely in the slot $k^6$, and if it strikes the right hand end of the slot $k^6$ (referring to Fig. 4), the effect is merely to throw the arm $k^2$ a little farther over and close completely the valve $e^2$, if the valve did not move, in its first movement, to a completely closed position. The movement of the arm $l^2$ produces a corresponding movement of the Geneva gear $l'$ and a corresponding movement of the Geneva stop $l$, thereby effecting a quarter turn of the double butterfly valve $e^3$. The purpose of this movement is merely to set the parts in position for subsequent action. The movement of the valve $e^3$ at this time takes place during the change from low pressure to high pressure and although there is a temporary opening of the passage through the low-duty meter, such opening serves no special purpose. The valve $e^2$ having been closed and the valve $e^3$ having received a quarter turn, the arm $h$ and the arm $g$ with the valve $f$ continue their movement to the extreme open position and the high-duty flow continues through the now wide open port $a^2$ without interruption and without substantial loss of head so long as the high pressure differential continues, a portion of the flow passing through the high-duty metering device $a^7$ and causing the proper registration by the registering devices at $a^8$.

When the pressure differential falls to normal or low-duty degree the valve $f$ swings downward and the weight $h^4$, acting through the shaft $h'$ and arm $h$, presses the valve $f$ to closed position. It is desirable that the low-duty valve $e^2$ shall not be opened until the valve $f$ has closed enough to stop completely the flow of water through the port $a^2$, but it is also desirable that there shall be a partial equalization of pressure on the opposite sides of the valve $f$ during the last part of its closing movement in order that such closing movement may be completed quickly. This partial equalization of pressure is accomplished by opening temporarily the passage through the low-duty devices. This is accomplished in the following manner, it being assumed now that the arm $h$ is moving from the position which it occupies when the valve $f$ is wide open to the position which it occupies when the valve $f$ is closed. In this movement the portion of the arm $h$ near the pin $h^7$ strikes the lug $l^5$ on the arm $l^4$ of the three-armed lever $l^2$ and through the described connections gives the valve $e^3$ a quarter turn, the pin $l^7$ traveling freely in the slot $k^6$ of the link $k^5$. This quarter turn of the valve $e^3$ affords a temporary release of pressure through the low-duty passages, and although very brief, produces a partial but sufficient equalization of pressure against the outlet side of the valve $f$ to facilitate appreciably the final closing movement of the valve $f$. This temporary opening of the passage, however, is not sufficient to cause any material effect upon the low-duty registering devices. As the movement of the arm $h$ continues toward the position which it occupies when the valve $f$ is completely closed, the pin $h^5$ strikes the arm $k^3$ and swings the valve $e^2$ from its closed position shown in Fig. 3 and indicated in Fig. 4, to its open position indicated in Fig. 2, the slotted link $k^5$ sliding freely over the pin $l^7$, but insuring the completion of the movement of the valve $e^2$ to its initial position through contact of the left hand end of the slot $k^6$ (referring to Fig. 4) with the pin $l^7$. The valve $f$ being now completely closed and the butterfly valve $e^2$ being open, the low-duty flow continues and is accurately measured by the low-duty metering devices $a^9$, $a^{10}$.

Although certain specific devices for effecting the closing of the low-duty passage before the high-duty passage is actually open, at the time of a change from a low pressure differential to a high pressure differential, and for producing a partial equalization of the pressure on the high-duty valve during its final closing movement and before the low-duty passage is permanently opened have been described herein, it will be understood that various mechanical devices for accomplishing these results may be constructed and that the invention is not limited to the particular construction shown and described herein.

I claim as my invention:—

1. A meter comprising a casing having a high-duty passage, a high-duty valve to control the same, a low-duty passage in said casing, a low-duty valve to control the same, and means actuated by the movement of the high-duty valve during the last of its closing movement to open temporarily the valve of the low-duty passage to equalize partially the pressure on the high-duty valve.

2. A meter comprising a casing having a high-duty passage, a high-duty valve to control said passage, an arm moving with said high-duty valve, a low-duty passage in said casing, a low-duty valve to control the same, and means independent of the arm but actuated by the arm during the beginning of its movement and before the high-duty valve opens to close the low-duty valve.

3. A meter comprising a casing having a high-duty passage, a high-duty valve to control said passage, an arm moving with said high-duty valve, a low-duty passage in said casing, a low-duty valve to control the same, and means independent of the arm but actuated by the movement of said arm to close the low-duty valve during the beginning of the movement of the arm and to open the low-duty valve during the final movement of the arm in the opposite direction.

4. A meter comprising a casing having a high-duty passage, a high-duty valve to control said passage, an arm moving with said high-duty valve, a low-duty passage in said casing, a low-duty valve to control the same, a Geneva gear on the shaft of the low-duty valve, a second Geneva gear coöperating with the first named gear, a notched arm carried with the last named gear, and a pin carried by the first named arm and engaging the notched arm to close the low-duty valve during the beginning of the movement of the first named arm and to open the low-duty valve during the final movement of the first named arm in the opposite direction.

5. A meter comprising a casing having a high-duty passage, a high-duty valve to control the same, a low-duty passage in said casing, low-duty valves to control the same, an arm moving with the high-duty valve, and means actuated by the movement of said arm to open and then close one of the low-duty valves during the last of the closing movement of said arm.

6. A meter comprising a casing having a high-duty passage, a high-duty valve to control the same, a low-duty passage in said casing, a double or cross-bladed butterfly valve to control the low-duty passage, and means actuated by the movement of the high-duty valve during the last of its closing movement to give the butterfly valve a quarter turn to open temporarily the low-duty passage.

7. A meter comprising a casing having a high-duty passage, a high-duty valve to control the same, a low-duty passage in said casing, a double or cross-bladed butterfly valve to control the low-duty passage, an arm moving with the high-duty valve, and means actuated by said arm during the last of the closing movement of the high-duty valve to give said butterfly valve a quarter turn and to open temporarily the low-duty passage.

8. A meter comprising a casing having a high-duty passage, a high-duty valve to control the same, a low-duty passage in said casing, a double or cross-bladed butterfly valve to control the low-duty passage, an arm moving with the high-duty valve, a Geneva gear on the shaft of the butterfly valve, a second Geneva gear coöperating with the first mentioned gear, an arm on the shaft of the second gear and a pin carried by the first mentioned arm.

9. A meter comprising a high-duty passage, a high-duty valve to control said passage, a low duty passage in said casing, two valves to control the low-duty passage, means actuated by the initial movement of the high-duty valve in its opening movement to close one of the valves in the low-duty passage, the other being normally closed, and in the closing movement of the high-duty valve to open temporarily the normally closed valve of the low-duty passage and afterward to open the other valve of the low-duty passage.

10. A meter comprising a casing having a high-duty passage, a high-duty valve to control said passage, a low-duty passage in said casing, a single butterfly valve and a double or cross-bladed butterfly valve to control the low-duty passage, and means actuated by the initial movement of the high-duty valve in its opening movement to close the single butterfly valve and by the last part of the movement of the high-duty valve in its closing movement to give the double butterfly valve a quarter turn and thereafter to open the single butterfly valve.

11. A meter comprising a casing having a high-duty passage, a high-duty valve to control said passage, a low-duty passage in said casing, a single butterfly valve and a double or cross-bladed butterfly valve to control the low-duty passage, an arm operatively connected to the single butterfly valve, an arm operatively connected to the double butterfly valve, and an arm moving with the high-duty valve and having pins to coöperate respectively with the arms of the butterfly valves.

12. A meter comprising a casing having a high-duty passage, a high-duty valve to control said passage, a low-duty passage in said casing, a single butterfly valve and a double or cross-bladed butterfly valve to control the low-duty passage, an arm operatively connected with the single butterfly valve, an arm operatively connected with the double butterfly valve, a link connected with one of said arms and having a slotted engagement with the other of said arms and an arm moving with the high-duty valve and having pins for coöperation respectively with the arms of the butterfly valves.

13. A meter comprising a casing having a high-duty passage, a high-duty valve to control said passage, a low-duty passage in said casing, a single butterfly valve and a double or cross-bladed butterfly valve to control the low-duty passage, and means actuated by the movement of the high-duty valve positively to lock said butterfly valves in their extreme positions.

This specification signed and witnessed this 15th day of July, A. D. 1913.

JAMES M. BURTON.

Signed in the presence of—
W. B. GREELEY,
E. M. TAYLOR.